United States Patent [19]

Sharrah et al.

[11] Patent Number: 5,410,237
[45] Date of Patent: Apr. 25, 1995

[54] BATTERY CHARGING UNIT

[75] Inventors: Raymond L. Sharrah, Collegeville; Charles W. Craft, Lansdale, both of Pa.

[73] Assignee: Streamlight, Inc., Norristown, Pa.

[21] Appl. No.: 106,481

[22] Filed: Oct. 25, 1991

[51] Int. Cl.⁶ .................... H01M 10/44; H01M 10/46
[52] U.S. Cl. ........................................................ 320/2
[58] Field of Search ............................................. 320/2

[56] References Cited

U.S. PATENT DOCUMENTS

| | | |
|---|---|---|
| 2,236,338 | 3/1941 | Emanuel . |
| 2,293,284 | 8/1942 | Emanuel . |
| 2,876,410 | 3/1959 | Fry . |
| 3,005,090 | 10/1961 | Moore . |
| 3,261,973 | 7/1966 | Kott . |
| 3,264,545 | 8/1966 | Kott . |
| 3,275,919 | 9/1966 | Decker et al. . |
| 3,281,637 | 10/1966 | Hultquist . |
| 3,390,319 | 6/1968 | Robison . |
| 3,517,185 | 6/1970 | Moore et al. . |
| 3,521,050 | 7/1970 | Shagena, Jr. . |
| 3,539,898 | 11/1970 | Tolmie . |
| 3,633,089 | 1/1972 | Dorion et al. . |
| 3,643,083 | 2/1972 | Heine . |
| 3,659,180 | 4/1972 | Urbush . |
| 3,679,958 | 7/1972 | Chambers . |
| 3,710,224 | 1/1973 | Daniels . |
| 3,746,961 | 7/1973 | Dobie . |
| 3,825,740 | 7/1974 | Friedman et al. . |
| 3,829,676 | 8/1974 | Nelson et al. . |
| 3,866,105 | 2/1975 | Heine et al. . |
| 3,885,211 | 5/1975 | Gutai . |
| 3,924,097 | 12/1975 | Knowles et al. . |
| 3,973,179 | 8/1976 | Weber et al. ............................ 320/2 |
| 3,976,986 | 8/1976 | Zabroski . |
| 4,045,663 | 8/1977 | Young . |
| 4,092,580 | 5/1978 | Prinsze . |
| 4,115,842 | 9/1978 | Keller . |
| 4,147,838 | 4/1979 | Leffingwell . |
| 4,225,814 | 9/1980 | Gantz et al. . |
| 4,282,562 | 8/1981 | Marino . |
| 4,388,673 | 6/1983 | Maglica . |
| 5,008,785 | 4/1991 | Maglica et al. . |
| 5,059,885 | 10/1991 | Weiss et al. ............................ 320/2 |
| 5,121,308 | 6/1992 | Maglica et al. . |
| 5,146,150 | 9/1992 | Gyenes et al. ...................... 320/2 X |
| 5,280,229 | 1/1994 | Faude et al. ............................ 320/2 |

Primary Examiner—Steven L. Stephan
Attorney, Agent, or Firm—Dann, Dorfman, Herrell and Skillman

[57] ABSTRACT

A battery charging unit is disclosed for use in connection with a rechargeable, battery-powered device, such as a flashlight, of the type having a contact-foot that includes at least two contacts connected to the battery terminals and an asymmetrical end-profile. The battery charging unit has a receptacle that includes an asymmetrical aperture that corresponds to the end-profile of the contact-foot to ensure that proper electrical polarity is maintained between the charging unit and the contact-foot. The receptacle also includes a retractable barrier and retaining walls that are formed to ensure that the contact-foot is retained in the receptacle regardless of the orientation of the charging unit.

5 Claims, 6 Drawing Sheets 5,410,237

1

BATTERY CHARGING UNIT

BACKGROUND OF THE INVENTION

This invention relates to a battery charging unit for an electrical device having a rechargeable battery, and in particular, to such a battery charging unit having a novel receptacle for receiving a contact foot of the electrical device that maintains proper electrical polarity between the charging unit and the contact foot and that retains the contact foot in the charging unit regardless of the orientation of the charging unit.

Portable electrical devices, such as flashlights and power tools, have come into great demand. Those devices often contain a rechargeable battery pack which is not readily removable from the device. Such a device usually has an external contact area which interfaces with a charging unit for charging or recharging the batteries in the device. In designing such devices and their corresponding charging units consideration must be given to assuring that the device is connected to the charging unit in a manner that assures proper electrical polarity between the contact area and the charging unit. Furthermore, since the designer cannot anticipate all of the different environments in which a charging unit may be installed, it is important that such a charging unit be able to retain the contact area of the device regardless of the orientation in which the charging unit may be mounted. Furthermore, in certain applications, such as those related to police and/or fire departments, the charging unit must be designed to withstand the rigors of such applications and yet be easy to use when time is of the essence. Heretofore, all of the foregoing design problems have not been adequately resolved in a single, known, charging unit.

SUMMARY OF THE INVENTION

The aforementioned problems associated with the known battery charging units are resolved to a large degree by the present invention which provides a battery charging unit for charging a rechargeable battery in a battery-powered device of the type having a contact-foot that includes at least two contacts connected to the battery terminals and an asymmetrical end-profile. In accordance with one aspect of the present invention, the battery charging unit includes a receptacle for receiving the contact-foot of the battery-powered device such that the contact-foot is retained in the charging unit regardless of the orientation of the charging unit. To that end, the receptacle has first and second sidewalls and a retractable barrier which has a retracted position for permitting the contact-foot to slide into the receptacle and a protruding position for preventing the contact-foot from sliding out of the receptacle.

In accordance with another aspect of the present invention, the first and second sidewalls form an asymmetrical aperture corresponding to the end-profile of the contact-foot to ensure that proper electrical polarity is maintained between the charging unit and the contact-foot.

BRIEF DESCRIPTION OF THE DRAWINGS

The foregoing summary as well as the following detailed description of a preferred embodiment of the invention will be better understood when read in connection with the appended drawings in which.

DETAILED DESCRIPTION

Figure 1:
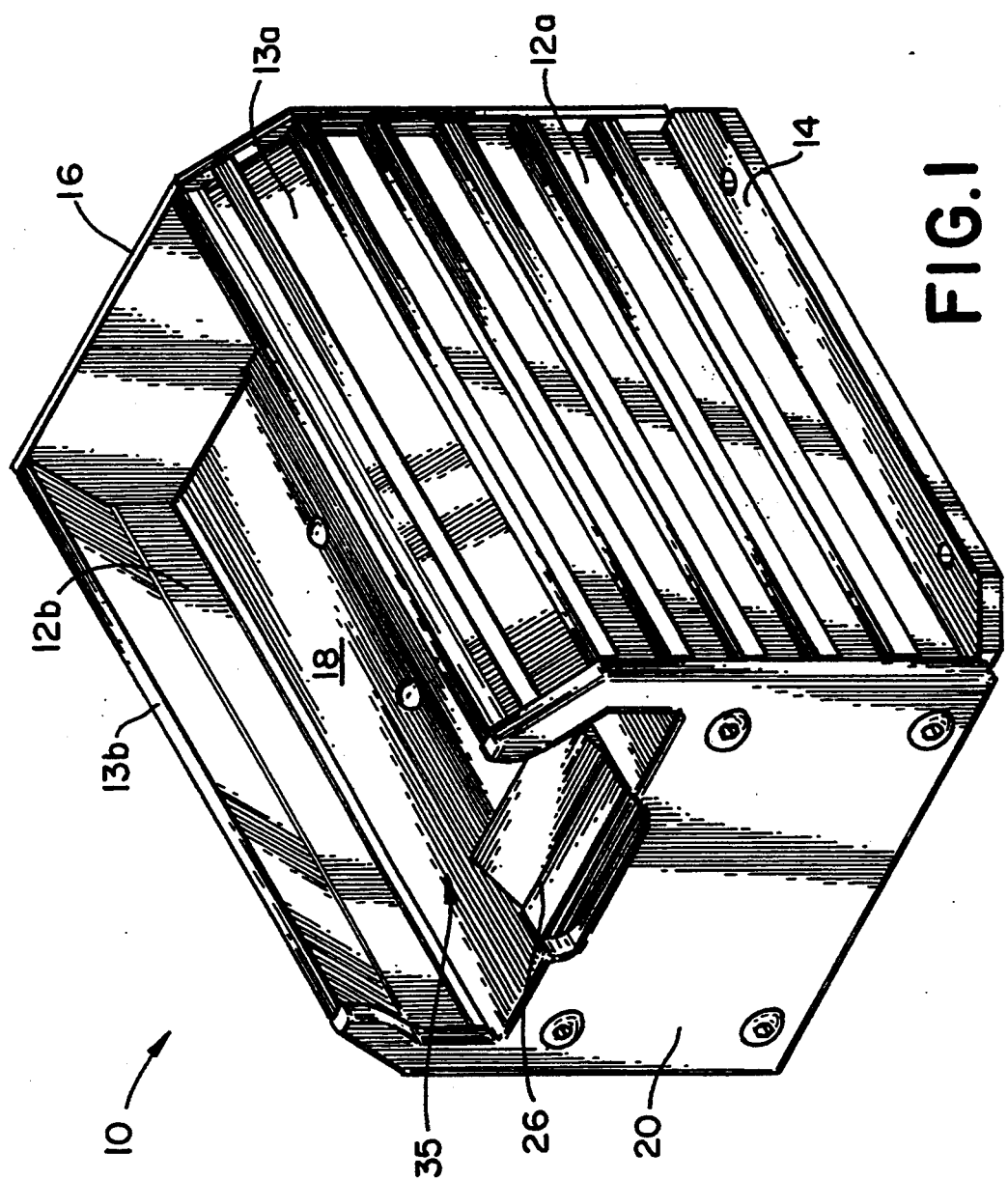
FIG. 1 is a front perspective view of a battery charging unit in accordance with the present invention.
Figure 2:
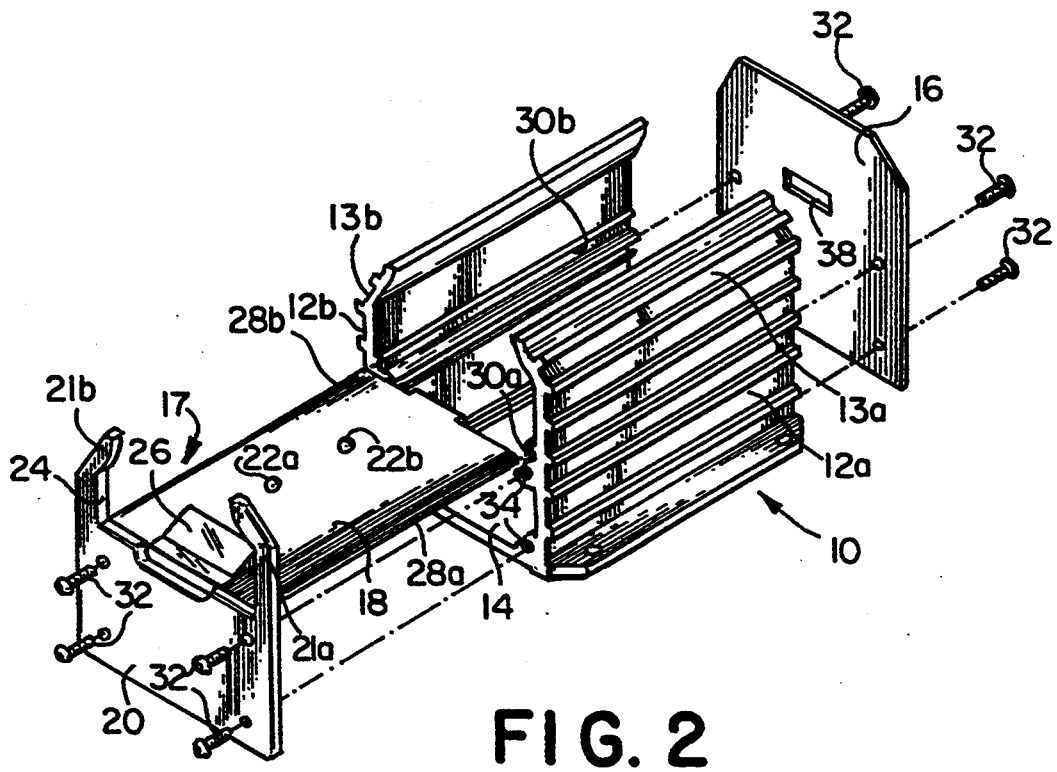
FIG. 2 is an exploded perspective view of the battery charging unit shown in FIG. 1.

Referring now to the drawings and in particular to FIGS. 1 and 2, there is shown a preferred embodiment of a battery charger unit in accordance with the present invention. The recharger unit 10 has a pair of sidewalls 12a and 12b and a base 14 interconnecting the end-walls 12a and 12b at one end respectively thereof. The sidewalls 12a and 12b have respective angled portions 13a and 13b at the ends of sidewalls 12a and 12b distal from the base 14. The angle of deflection of angled portion 13a is greater than the angle of deflection of angled portion 13b thereby providing an asymmetrical or keyed channel. The end-walls 12a and 12b and base 14 are preferably formed of extruded metal, such as aluminum, in order to form a rigid, integral unit. It will be appreciated, however, that another suitable material, for example, a plastic or composite material, can also be used.

An end-wall 16 is attached to one end of the battery charge unit 10 in order to close off the opening at that end. The end-wall 16 has a tapered shape that is congruent with the keyed channel defined by sidewalls 12a and 12b and base 14.

The battery charger unit 10 also includes a support assembly 17 having a contact panel 18 and an end-panel 20 which are attached in perpendicular relation to each other at respective ends thereof. Angled finger portions 21a and 21b extend from the end of end-panel 20 attached to contact panel 18. Finger portion 21a has a deflection angle identical to that of angled portion 13a and finger portion 21b has a deflection angle identical to that of angled portion 13b. In this manner, the end panel 20 and the angled finger portions 21a and 21b define an aperture 24 that has the same asymmetry as the channel defined by sidewalls 12a and 12b.

The contact panel 18, which is positioned between sidewalls 12a and 12b in spaced, parallel relation to base 14, has side edges 28a and 28b which are formed for sliding engagement with channels 30a and 30b formed in end-walls 12a and 12b, respectively, at a location adjacent the angled portions 13a and 13b. A tab 36 is formed in one end of contact panel 18 and is dimensioned and positioned to fit in an opening 38 formed in end-wall 16. The contact panel 18 is dimensioned to fit snugly between sidewalls 12a and 12b when fully inserted in channels 30a and 30b. In this manner the support assembly 17 is securely mounted in the recharger unit 10, rigidly spaces the sidewalls 12a and 12b, and thus adds to the rigidity of the unit.

End-wall 16 and end-panel 20 are secured to the sidewalls 12a and 12b by fasteners such as screws 32 which are retained in the fastener receptacles 34 formed in sidewalls 12a and 12b. As shown in FIG. 1, the contact panel 18, sidewalls 12a and 12b, and end-wall 16 define a receptacle 35 having an asymmetrical or keyed aperture for receiving the contact foot of a rechargeable, battery-powered device.

Figure 3:
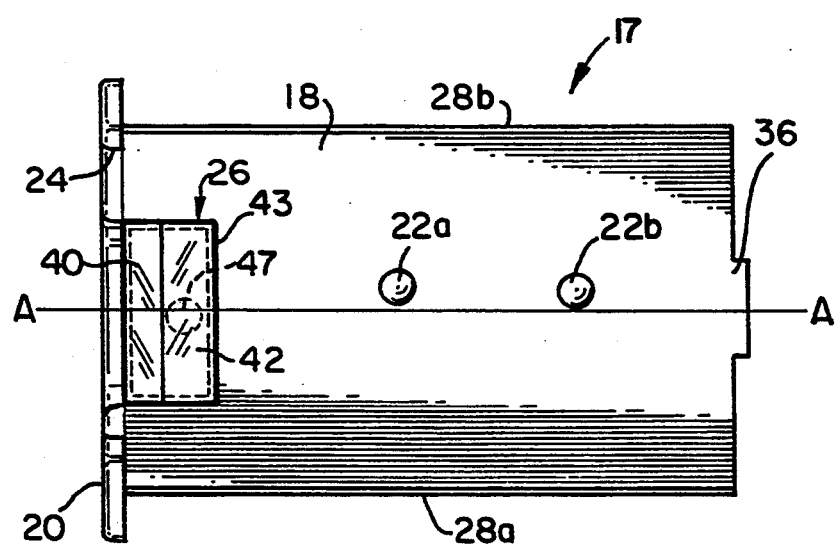
FIG. 3 is a plan view of the support assembly 17 shown in FIG. 2.
Figure 4:
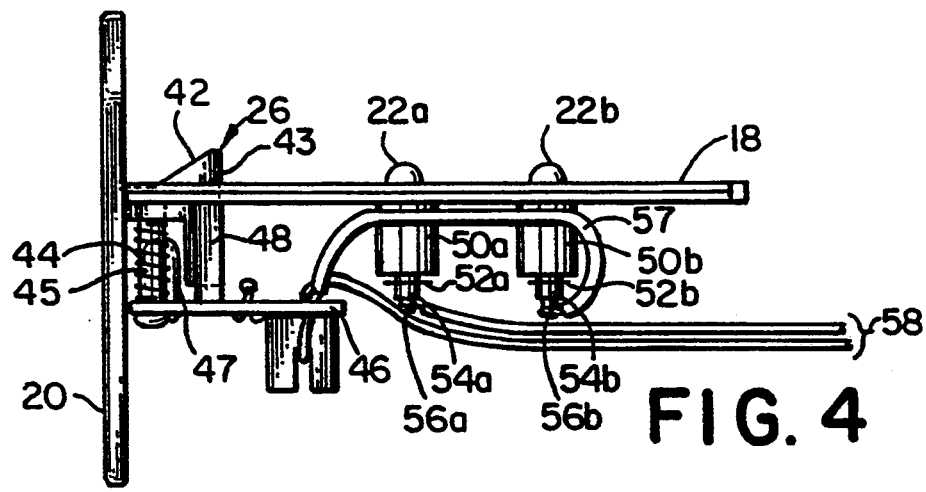
FIG. 4 is a side elevational view of the support assembly 17 shown in FIG. 2.

Referring now to FIGS. 3 and 4, a retractable stop 26 and retractable contacts 22a and 22b are mounted on contact panel 18. The retractable stop 26 has a flat portion 40 adjacent the end panel 20, an inclined portion 42 which inclines in a direction away from the aperture 24 toward end-wall 16, and a stop-face 43 extending from the inclined portion 42 toward the contact panel 18. Stop-face 43 is preferably oriented perpendicularly to the plane of contact panel 18. Retractable stop 26 has a first or protruding position as shown in FIG. 4 and a second or retracted position where the inclined portion 42 and stop-face 43 are at or below the plane of the contact panel 18. In this manner, a contact foot can slide through the asymmetrical aperture 24 into the receptacle, but is prevented from sliding in the opposite direction, unless the retractable stop 26 is moved to its retracted position. The retractable stop 26 is maintained in the protruding position, its normal position, by a spring 44 mounted coaxially on a shaft 45. The shaft 45 and a spacer 48 which extend from the contact panel 18 also support a charging circuit board 46.

The charging circuit board 46 includes a luminous indicating device such as light emitting diode (LED) 47 which indicates the status of the charging process during operation of the charging unit. In accordance with a preferred feature of the present invention, the LED 47 is located on circuit board 46 adjacent the end-panel 20 and directly below the retractable stop 26. Retractable stop 26 is preferably formed of transparent material such that the LED 47 can be seen through the retractable stop 26 as shown in FIG. 3, for example. It is contemplated that the charging unit in accordance with the present invention can be used with both fast-charge and slow-charge circuits. Such circuits are generally known in the art. When a fast-charge circuit is used, the circuit board 46 preferably includes a second LED to indicate when the fast charge mode is completed and the unit is in a charged or trickle charge mode.

Retractable contacts 22a and 22b are disposed on contact panel 18 in spaced relation so as to coincide with the contacts in the contact-foot when the contact-foot is properly inserted in the receptacle 35. In the embodiment shown in FIG. 3, retractable contacts 22a and 22b are offset from the centerline A—A of contact panel 18 for that purpose. The asymmetry of the receptacle aperture 24 and the offset of the contacts assure correct polarity when the device to be recharged is inserted into the charging unit. The retractable contacts 22a and 22b are spring-loaded in contact sleeves 50a and 50b, respectively, which extend from contact panel 18 toward the base 14. Retractable contacts 22a and 22b each have a first or protruding position in the absence of a contact foot in the receptacle and a second or retracted position when a contact foot is present in the receptacle. Preferably, the protruding portion of each contact has a rounded shape in order to facilitate sliding the contact foot thereover during insertion into and removal from the charging unit receptacle 35.

As shown in FIG. 4, the contacts 22a and 22b have shafts 54a and 54b, respectively, which extend through the sleeves 50a and 50b, respectively. Retainer clips 52a and 52b are attached about the shafts 54a and 54b, respectively, to retain the contacts 22a and 22b in their respective sleeves. The retainer clips 52a and 52b are attached on the shafts 54a and 54b to prevent the contacts 22a and 22b from protruding more than a preselected distance above the contact panel 18. The shafts 54a and 54b include terminal lugs 56a and 56b to which wire leads 57 and 58 are connected. For example, wire lead 57 connects contact 22b to the charging circuit board 46. Two wire leads 58 connect the charging circuit board 46 and contact 22b to an external power source.

Figure 5:
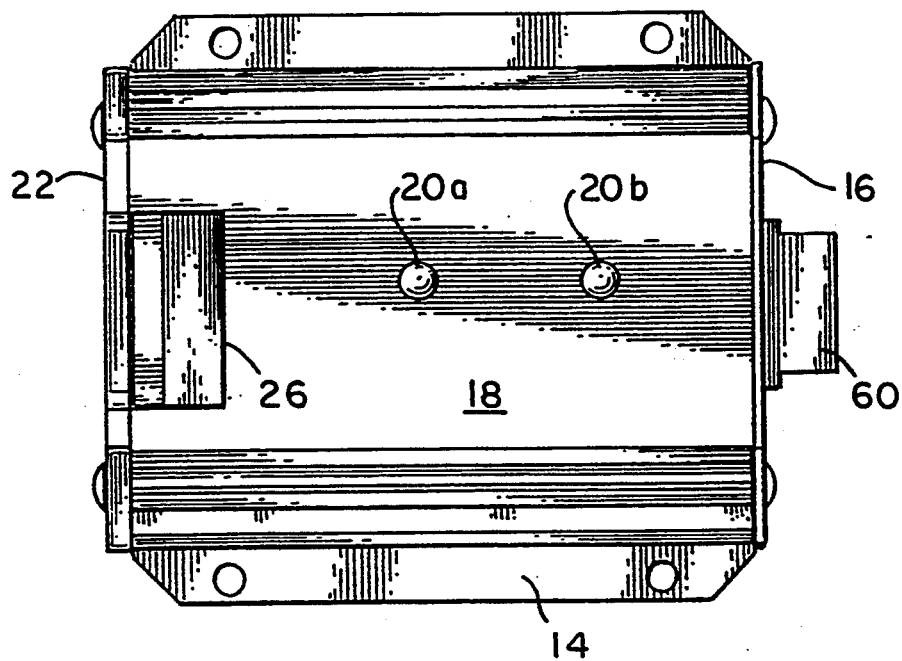
FIG. 5 is a plan view of a battery charging unit according to the present invention showing a preferred arrangement for connecting the unit to an external power source.
Figure 6:
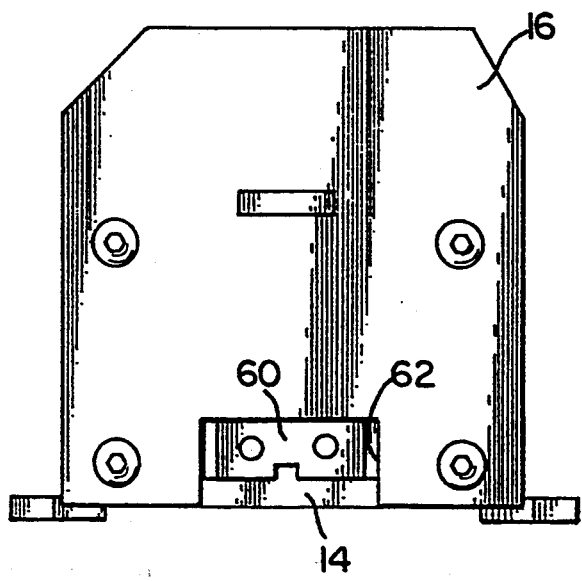
FIG. 6 is a rear elevational view of the battery charging unit shown in FIG. 5.
Figure 7:
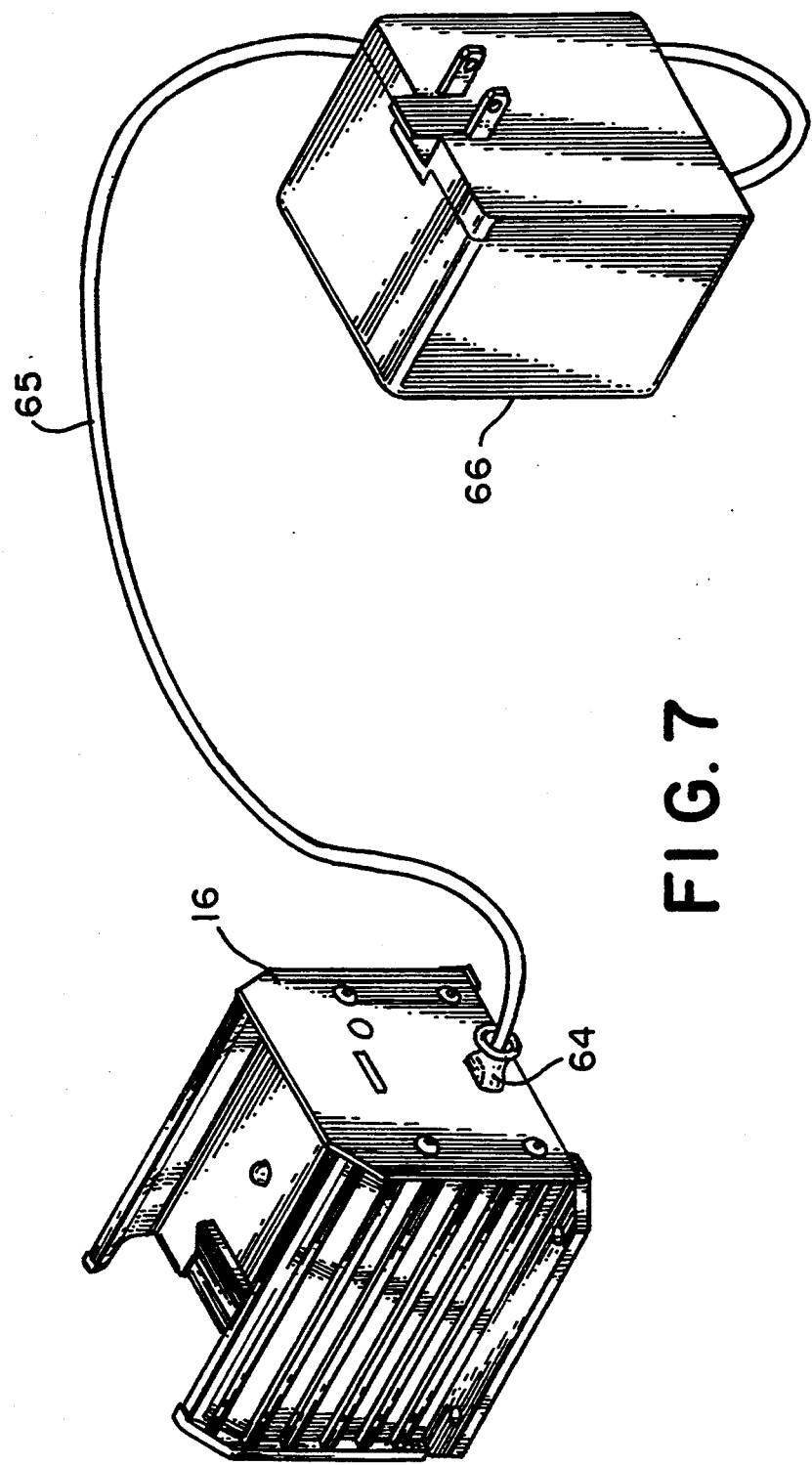
FIG. 7 is a perspective view of a charging unit according to the present invention showing an alternative arrangement for connecting the unit to an external power source.

Referring now to FIGS. 5 and 6, there is shown a preferred arrangement for connecting the wire leads 58 to an external power source. A jack 60 is mounted in an opening 62 in end-wall 16 adjacent the base 14. The jack 60 is a two-conductor jack for mating with a two-conductor plug of the type connected to a conventional AC to DC transformer or connected directly to a DC voltage source. In an alternate embodiment as shown in FIG. 7, the wire leads 58 are connected directly to a cable 65 which passes through a wire gripping sleeve 64 mounted in end-wall 16. Cable 65 is hard-wired directly to an AC to DC transformer 66 of conventional design.

Figure 8:
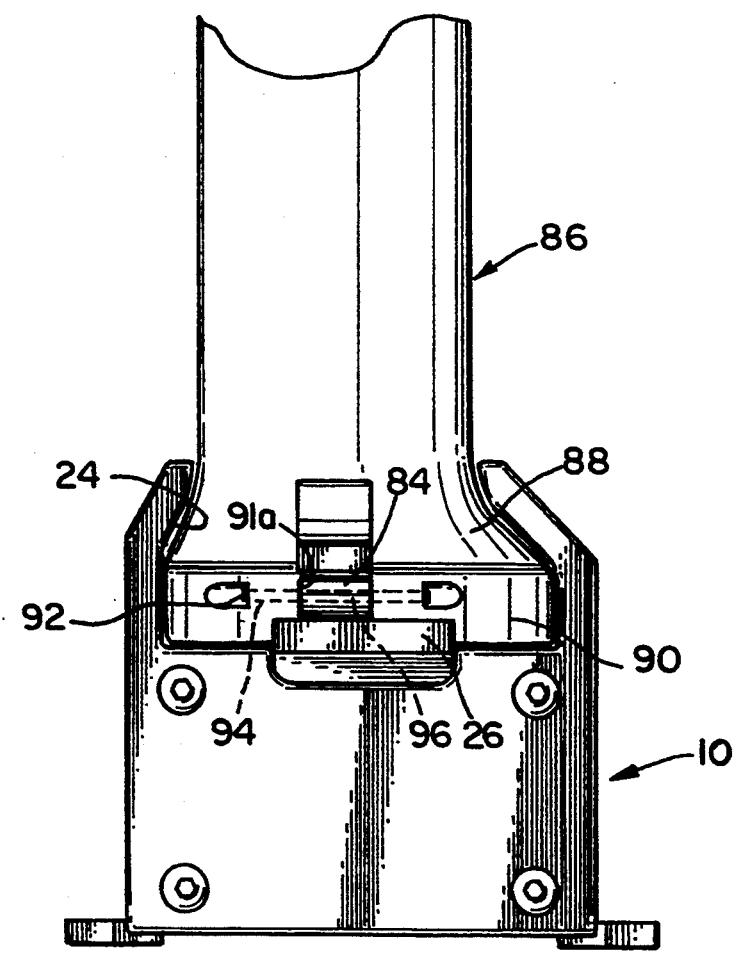
FIG. 8 is an elevational assembly view showing a rechargeable device inserted in a charging unit according to the present invention.

Referring now to FIG. 8 of the drawings, there is shown the lower portion of a flashlight 86, having a flared contact foot 88 and a base 90, inserted in the receptacle 35 of the charging unit 10 according to the present invention. Because of the asymmetry of the end-profile of the contact foot 88 of flashlight 86, the contact foot 88 can be inserted properly through the asymmetrical aperture of the charger unit receptacle 35 with only one orientation. Furthermore, the retractable stop 26 is in its protruding position which prevents the contact foot 88, and hence the flashlight 86, from sliding out of the receptacle 35 unless the retractable stop 26 is in its depressed position. It will be appreciated that, by virtue of the construction of battery charger unit 10, it can be mounted in virtually any orientation, vertically upright or inverted, or horizontally face-up or face-down, and the contact foot of flashlight 86 is retained in the charging unit receptacle 35.

Figure 9:
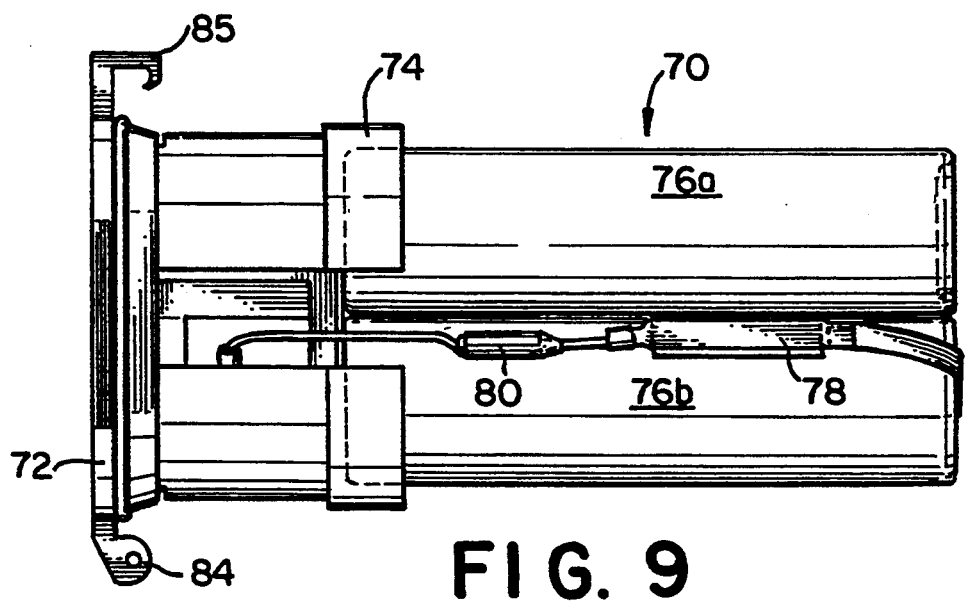
FIG. 9 is a front elevation view of a preferred battery pack for a rechargeable device of the type used with a charging unit according to the present invention.
Figure 11:
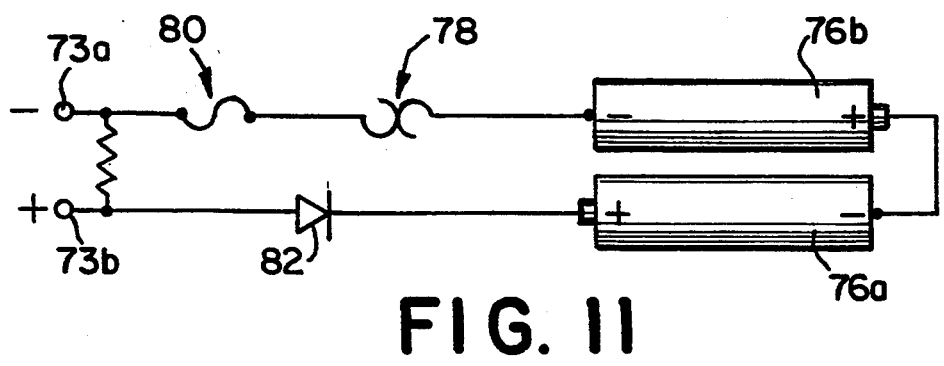
FIG. 11 is a schematic diagram of a circuit for the battery pack shown in FIG. 9.
Figure 10:
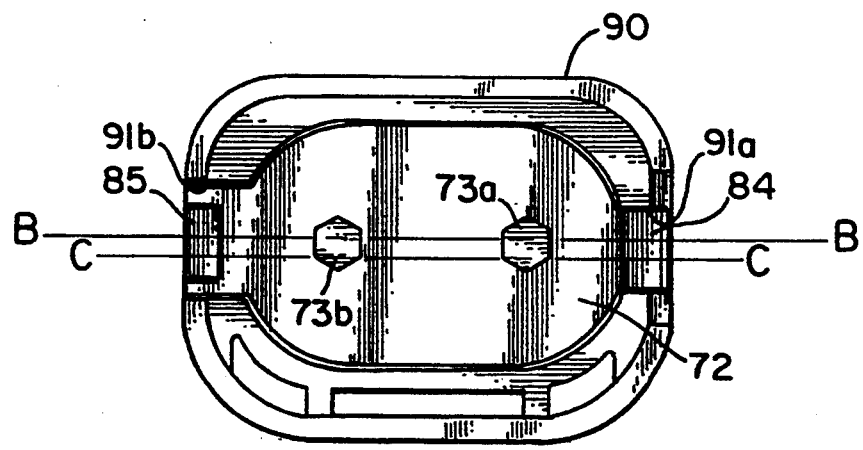
FIG. 10 shows the arrangement of the base of the rechargeable device shown in FIG. 8.

In accordance with a further aspect of the present invention there is shown in FIGS. 9, 10 and 11 a preferred battery pack 70 for use in a battery-powered device, such as flashlight 86. As shown in FIG. 9, the battery pack 70 includes a base 72 and a battery support-/holder 74 in which the batteries 76a and 76b are mounted. As shown in FIG. 10, the base 72 of battery pack 70 has a pair of tabs 84 and 85. Tab 84 is narrower than tab 85, thereby providing a keyed arrangement for mounting the battery pack 70 in the flashlight base 90. The flashlight base 90 has notches 91a and 91b formed therein, notch 91a being positioned and dimensioned to receive tab 84 and notch 91b being positioned and dimensioned to receive tab 85.

A pair of contacts 73a and 73b are preferably flush mounted on the base 72. As shown in FIG. 10, the contacts 73a and 73b are located along a centerline B—B of the base 72, but are offset from the centerline C—C of the flashlight base 90 because of the asymmetry of the contact foot 88. The base 72 of the battery pack 70 is retained in the flashlight 86 by means of retaining pins through tabs 84 and 85 and base 90. In a preferred arrangement as shown in FIG. 8, a retaining pin 92 is inserted through a borehole 94 formed in the base 90 on both sides of notch 91a. A borehole 96 formed in tab 84 of base 72 aligns axially with the hole 94 to permit the pin 92 to pass through the base 90, through hole 94, and back into base 90. A similar arrangement is provided with respect to tab 85 of base 72.

In connection with a still further aspect of the present invention, there is shown in FIG. 11 a preferred circuit for the battery pack 70. A thermal fuse 80 is connected in series with a thermal contact 78 to the negative terminal of battery 76b. The positive terminal of battery 76b is connected to the negative terminal of battery 76a and a diode 82 is connected in series between the positive terminal of battery 76a and the positive polarity contact. A resistor 83 connected across the contacts 73a and 73b provides a load which can be sensed by the charging circuit in the recharger unit whereby the charging circuit determines the presence of the battery pack when it is inserted in the recharger receptacle to be recharged. The thermal contact 78 is used in a known manner to interrupt the charging current to the batteries when the temperature of the battery pack 70 exceeds a predetermined temperature limit. Thermal fuse 80 performs a similar function should thermal contact 78 fail to operate properly. The diode 82 prevents inadvertent discharge of the batteries 76a and 76b through the contacts 73a and 73b of the battery pack 70.

In view of the foregoing description and the accompanying drawings, some of the many novel features and advantages of the battery charging unit according to the present invention are now apparent. For example, a novel battery charging unit has been described which has a receptacle with an asymmetrical opening and a contact arrangement for assuring that a device to be recharged is connected to the charging unit with the proper polarity. The charging unit has retaining walls, which define the asymmetrical opening, and a retractable barrier to retain the contact foot of the rechargeable device, regardless of the orientation of the charging unit. The retractable barrier has an inclined portion that facilitates insertion of the contact foot into the charging unit receptacle, thereby permitting one-handed insertion of the rechargeable device.

It will be recognized by those skilled in the art that changes or modifications may be made to the above-described without departing from the broad inventive concepts of the invention. It is understood, therefore, that the invention is not limited to the particular embodiments which are disclosed but is intended to cover all modifications and changes which are within the scope and spirit of the invention as defined in the appended claims.

What is claimed is:

1. A battery charging unit for charging a rechargeable battery in a battery-powered device of the type having a contact-foot that includes at least two contacts connected to the battery terminals and has an asymmetrical end-profile, said charging unit comprising:

a receptacle for receiving the contact-foot of the battery-powered device, said receptacle having first and second sidewalls, an end-wall, and a retractable barrier for retaining said contact-foot in said receptacle, said first and second sidewalls forming an asymmetrical aperture corresponding to the end-profile of the contact-foot, said first sidewall having a first portion angled toward said second sidewall, said second sidewall having second portion angled toward said first sidewall, wherein the first angled portion has an angle of deflection greater than the angle of deflection of the second angled portion, said end-wall being attached to said first and second sidewalls at an end thereof distal from said asymmetrical aperture so as to retain the contact-foot in said receptacle, and said retractable barrier having a retracted position for permitting the contact-foot to slide in a first direction through the asymmetrical aperture and a protruding position for preventing the contact-foot from sliding through the asymmetrical aperture in a second direction opposite to the first direction.

2. A battery charging unit for charging a rechargeable battery in a battery-powered device of the type having a contact-foot that includes at least two contacts connected to the battery terminals and has an asymmetrical end-profile, said charging unit comprising:

a receptacle for receiving the contact-foot of the battery-powered device, said receptacle having first and second sidewalls, an end-wall, a retractable barrier for retaining said contact-foot in said receptacle, a contact panel, and a pair of contacts mounted on said contact panel, said first and second sidewalls forming an asymmetrical aperture corresponding to the end-profile of the contact-foot, said end-wall being attached to said first and second sidewalls at an end thereof distal from said asymmetrical aperture so as to retain the contact-foot in said receptacle, said contact panel extending in a plane that is perpendicular to said first and second sidewalls and to said end-wall, said contacts being disposed on said contact panel in spaced relation so as to coincide with the contacts in the contact-foot when the contact-foot is inserted in said receptacle, whereby electrical connection is made between the battery charging unit and the contact-foot with proper polarity, and said retractable barrier having a retracted position for permitting the contact-foot to slide in a first direction through the asymmetrical aperture and a protruding position for preventing the contact-foot from sliding through the asymmetrical aperture in a second direction opposite to the first direction; and a charging circuit board supported from said contact panel, said circuit board including a luminous indicating device for indicating the status of the charging process, said luminous indicating device being mounted on said circuit board at a location directly below said retractable barrier, said retractable barrier being formed of a transparent material, whereby said luminous indicating device can be viewed through said retractable barrier.

3. A battery charging unit as recited in claim 2 comprising a spring operatively coupling said retractable barrier to said contact panel such that said retractable barrier is maintained in the protruding position.

4. A battery charging unit as recited in claim 3 wherein said retractable barrier comprises an inclined portion which inclines in a direction away from the asymmetrical aperture such that said retractable barrier can be moved into its retracted position to permit the contact foot to be inserted through the asymmetrical aperture and into said receptacle.

5. A battery charging unit as recited in claim 2 wherein each of said contacts comprises a shaft portion and a retaining clip and said contact panel comprises a contact sleeve and a spring disposed therein, said contact shaft being slidably disposed through said spring and said retaining clip being attached to said contact shaft such that said contact is prevented from protruding more than a preselected distance above the contact panel.

* * * * *